United States Patent
Busson et al.

(10) Patent No.: US 7,474,693 B2
(45) Date of Patent: Jan. 6, 2009

(54) ELECTRONIC COMPONENT NOTABLY FOR DECODING SIGNALS MODULATED BY A DIGITAL QUADRATURE MODULATION OVER A LARGE NUMBER OF ORTHOGONAL CARRIERS

(75) Inventors: Pierre Busson, Grenoble (FR); Bruno Paille, Saint Aupre (FR)

(73) Assignee: STMicroelectronics, SA, Montrouge (FR)

( * ) Notice: Subject to any disclaimer, the term of this patent is extended or adjusted under 35 U.S.C. 154(b) by 889 days.

(21) Appl. No.: 10/915,959

(22) Filed: Aug. 11, 2004

(65) Prior Publication Data
US 2005/0058214 A1   Mar. 17, 2005

(30) Foreign Application Priority Data
Aug. 12, 2003   (FR) .................. 03 09871

(51) Int. Cl.
*H04B 1/38* (2006.01)
(52) U.S. Cl. ................................ 375/219
(58) Field of Classification Search ............. 375/219, 375/220, 222, 260, 261; 455/20, 42, 69, 455/77, 82, 84, 87, 114.2, 286, 307; 367/117, 367/135, 137
See application file for complete search history.

(56) References Cited

U.S. PATENT DOCUMENTS

| | | | | |
|---|---|---|---|---|
| 6,044,112 A | 3/2000 | Koslov | | 375/235 |
| 6,292,652 B1 * | 9/2001 | Kim | | 455/20 |
| 7,292,649 B2 * | 11/2007 | Atkinson et al. | | 375/316 |
| 2002/0090915 A1 * | 7/2002 | Komara et al. | | 455/69 |
| 2004/0152418 A1 * | 8/2004 | Sinha et al. | | 455/42 |
| 2004/0180640 A1 * | 9/2004 | Zipper | | 455/196.1 |

FOREIGN PATENT DOCUMENTS

| | | |
|---|---|---|
| EP | 0587129 | 3/1994 |
| EP | 0597653 | 5/1994 |
| EP | 0678974 | 10/1995 |
| EP | 0878916 | 11/1998 |

OTHER PUBLICATIONS

Awang et al., Sol-Gel Derived Bulk Acoustic Wave Devices for Cellular Communication Applications, Semiconductor Electronics, 1996, ICSE 96 Proceedings, 1996 IEEE International Conference on Penang, Malaysia, Nov. 26-28, 1996, New York, NY, pp. 238-243.

* cited by examiner

*Primary Examiner*—Don N Vo
(74) *Attorney, Agent, or Firm*—Lisa K. Jorgenson; Allen, Dyer, Doppelt, Milbrath & Gilchrist

(57) ABSTRACT

An input/output terminal receives a multi-channel analog signal within a predetermined frequency band, and transmits a single-channel analog signal within this frequency band. A tuning module has a reception channel based upon a two-stage down conversion to baseband, and is connected between the input/output terminal and an analog-to-digital conversion stage. A transmission channel based upon a two-stage up conversion is connected between a digital-to-analog conversion stage and the input/output terminal. The two channels include a common filter of the bulk acoustic wave type or of the surface acoustic wave type between the two frequency transposition stages of the two channels. A digital reception unit is connected to the output of the analog-to-digital conversion stage, and a digital transmission unit is connected to the input of the digital-to-analog conversion stage.

32 Claims, 8 Drawing Sheets

ELECTRONIC COMPONENT NOTABLY FOR DECODING SIGNALS MODULATED BY A DIGITAL QUADRATURE MODULATION OVER A LARGE NUMBER OF ORTHOGONAL CARRIERS

FIELD OF THE INVENTION

The invention relates to the decoding and encoding of radio frequency transmission channels carrying encoded digital information, and more particularly, to signals using a digital quadrature modulation over a large number of "orthogonal" carriers, i.e., orthogonal frequency division multiplexing (OFDM), to carry information.

The invention thus applies to wireless local area networks (WLAN networks) such as those defined by the 802.11A standard, and the invention especially relates to tuners.

BACKGROUND OF THE INVENTION

The analog signals received at the input of a tuner include a set of transmitted channels within the 5-6 GHz frequency band, for example. These signals are modulated with OFDM-type modulations. The tuner has a down converted reception channel whose purpose is to select the desired channel and to output a signal on the in-phase channel (channel I) and on the quadrature channel (channel Q). This signal is then converted into a digital signal and demodulated to provide a data stream conforming to the MPEG standards, for example, which will be decoded to deliver the information initially transmitted.

The tuner also has an upconverted channel which allows a signal of the OFDM type to be remodulated and which allows a single-channel signal in the frequency band being considered, for example 5-6 GHz, to be transmitted from the tuner output.

Currently, two types of tuner architecture are used for receivers in the 5-6 GHz band. A first architecture is of the super-heterodyne type. However, this does not allow the tuner to be completely integrated. A second type of architecture is the ZIF, or zero intermediate frequency type, which allows the tuner to be more readily integrated. However, this presents a poorer rejection of the channels adjacent to the desired channel.

SUMMARY OF THE INVENTION

An object of the invention is to provide a component that allows signals in the down converted channel to be decoded while preserving an excellent rejection of the adjacent channels (high 3rd-order intermodulation rejection ratio).

Another object of the invention is to provide such a component whose tuner may be totally integrated on a single chip, as well as corresponding digital processing stages also being integrated on a single chip.

These and other objects of the invention are provided by an electronic component comprising an input/output terminal for receiving a multichannel analog signal within a predetermined frequency band, for example in the 5-6 GHz band, and for transmitting a single-channel analog signal within this frequency band. A tuning module has a reception channel of the type with a two-stage down conversion to baseband, and is connected between the input/output terminal and an analog-to-digital conversion stage. A transmission channel of the type with a two-stage up conversion is connected between a digital-to-analog conversion stage and the input/output terminal. The electronic component may further comprise a digital reception unit connected to the output of the analog-to-digital conversion stage, and a digital transmission unit may be connected to the input of the digital-to-analog conversion stage.

In addition, the two channels of the tuning module (tuner) may comprise a common filter of the bulk acoustic wave type (BAW filter), or of the surface acoustic wave type (SAW filter). This common filter may be between the two frequency transposition stages of the two channels.

The electronic component according to the invention therefore has a tuner architecture of the D-ZIF type. In other words, a two-stage down conversion to baseband is used. The first down conversion via an intermediate frequency allows the frequency to be first converted into an intermediate frequency, for example 1.22 GHz, limiting the DC offset, and more importantly, allowing filtering by a bandpass filter of the SAW type or by a filter of the BAW type which, being particularly narrow, offers the advantage of rejecting the adjacent channels.

This first conversion also allows a fixed intermediate frequency to be used, therefore allowing the signal to be down converted to baseband using a fixed oscillator frequency providing a closer quadrature between the I and Q channels. The second down conversion (to baseband) facilitates the integration of the bandpass filters and avoids the existence of an image frequency.

According to an embodiment of the invention, the frequency of the transposition signal applied to the frequency transposition stage of each channel, between the common filter and the input/output terminal, is equal to the frequency of the desired channel reduced by the central frequency of the common filter.

The transposition signal frequency applied to the other frequency transposition stage of the reception channel may be equal to the central frequency of the common filter. The frequency of the transposition signal applied to the other (first) transposition stage of the transmission channel, the central frequency of the digital signal present at the input of the digital-to-analog conversion stage (intermediate frequency of the digital signal before passing through the digital-to-analog converter), as well as the sampling frequency of this digital-to-analog conversion stage, may be chosen to obtain, after frequency transposition and upstream of the common filter, a transposed signal having a frequency harmonic equal to the central frequency of the common filter.

According to an embodiment of the invention, the frequency of the transposition signal applied to the other transposition stage of the transmission channel, in other words, the stage between the digital-to-analog converter and the common filter, and the sampling frequency of the digital-to-analog conversion stage may be sub-multiples of the central frequency of the common filter.

If the common filter is a filter of the bulk acoustic wave type (FBAW), the component additionally and advantageously comprises a determination circuit for determining the central frequency of this bulk acoustic wave filter. It is known that the central frequency of a bulk acoustic wave filter, which is for example, composed of at least two resonators of the bulk acoustic wave type, is difficult to predict with precision based on the physical characteristics of the resonators. This problem, which would seem to render incompatible the use of an integrated filter of the BAW type within a tuner, is addressed according to the invention by an in situ determination of the central frequency of the filter.

Two possibilities are then offered in regards to determining this central frequency. According to a first variation of the invention, the determining circuit comprise means or circuitry that, in the absence of the input signal at the input of the first transposition stage of the reception channel, are designed to vary, below the lower limit of the frequency range of the channels, the frequency of a calibration transposition signal applied to this transposition stage.

In addition, a detection circuit determines, for each value of the frequency of the calibration signal, the power of the output signal from the bulk acoustic wave filter and to detect the maximum power, so that the central frequency of the common filter is then the frequency of the calibration signal corresponding to this maximum power value.

According to another variation of the invention, which uses the presence of the digital-to-analog conversion stage, a determination circuit may deliver a sinusoidal calibration signal of a variable frequency to the input of the analog-to-digital conversion stage, and to vary the frequency of this calibration signal.

In addition, a detection circuit may be provided to determine, for each value of the frequency of the calibration signal, the power of the output signal from the bulk acoustic wave filter and to detect the maximum power, so that the central frequency of the common filter is then the frequency of the calibration signal corresponding to this maximum power value.

If this common filter is of the bulk acoustic wave type, the tuning module may, advantageously, be fabricated in the form of an integrated circuit on a monolithic substrate. In other words, in this case, the tuner may be fabricated in a totally integrated manner on the same chip. Further, it is also possible for the component to be fabricated in the form of an integrated circuit on a monolithic substrate. In other words, not only the tuner but also the digital reception stage and the digital transmission stage form integral parts of the same chip.

If the common filter is of the surface acoustic wave type (SAW filter), apart from the common filter, the tuning module may be fabricated in the form of an integrated circuit on a monolithic substrate. This means that, in this case, the SAW filter is placed outside or external the chip incorporating the tuner. In the same way, when the entire component is fabricated in the form of an integrated circuit on a monolithic substrate (a single chip), the common filter of the SAW type is again situated outside the chip.

The reception signal and the transmission signal may be, for example, signals modulated according to a multi-carrier modulation of the OFDM type.

Another aspect of the invention is to provide a device for transmission/reception on a wireless local area network, for example, complying to the 802.11A standard and incorporating a component as defined above.

BRIEF DESCRIPTION OF THE DRAWINGS

Other advantages and features of the invention will become apparent from consideration of the detailed description of non-limiting embodiments and the appended drawings, in which.

DETAILED DESCRIPTION OF THE PREFERRED EMBODIMENTS

Figure 1:
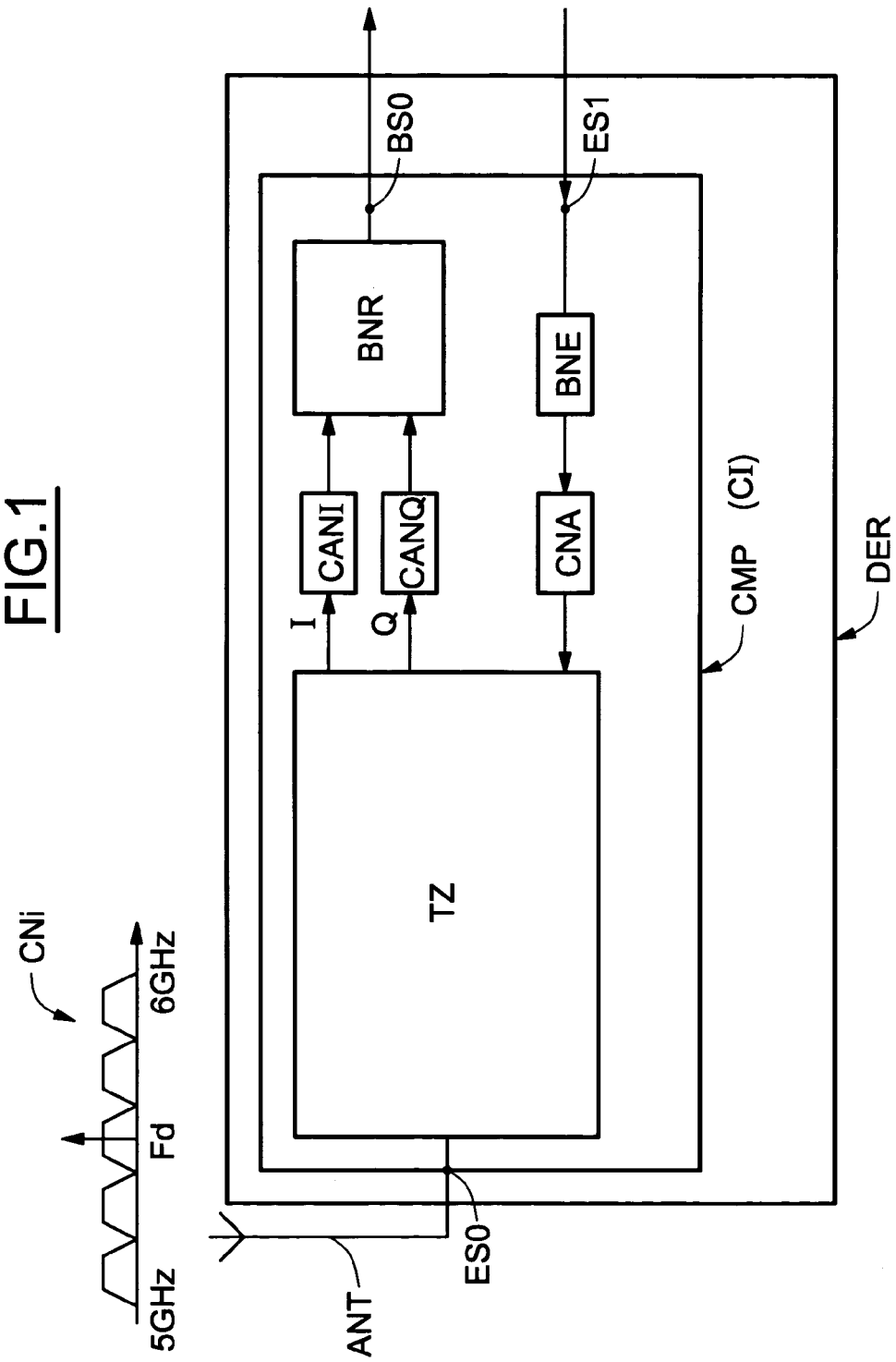
FIG. 1 illustrates schematically a first embodiment of a component according to the invention.

In FIG. 1, the reference DER designates a transmission/reception device connected to an antenna ANT capable of picking up analog signals modulated with a modulation of the OFDM type and composed of several channels CNi spread over the 5-6 GHz frequency band. The device is also capable of transmitting, via this antenna ANT, but non-simultaneously, a single-channel signal of the OFDM type, also situated within this frequency band. This device DER forms, for example, part of a wireless local area transmission network (WLAN network) conforming to the 802.11A standard.

The device DER front end comprises an electronic component CMP which, at reception, is capable of acquiring all of the channels CNi present in the signal received at the signal input ES0 and of delivering, at the output BSO, a stream of MPEG data corresponding to a selected channel. At transmission, the digital information corresponding to a desired channel for transmission is delivered to the input ES1 and then, following modulation and frequency transposition, is output in the form of a single-channel analog signal to the terminal ES0 for transmission via the antenna ANT.

In the illustrated example, the component CMP is in the form of an integrated circuit CI (chip) entirely fabricated in CMOS technology on a monolithic silicon substrate. As will be seen in more detail below, the tuner TZ comprises a reception channel, of the type using a two-stage down conversion to baseband, connected to the input/output terminal BSO and delivering two analog signals I and Q in quadrature.

The tuner TZ also comprises an up converted transmission channel, of the type using a two-stage up conversion, connected between the output of a digital-to-analog converter CNA and the input/output terminal ES0. An analog-to-digital conversion stage CANI, CANQ connects the output of the reception channel of the tuner TZ to a digital reception unit BNR, while a digital transmission unit BNE is connected between the input ES1 and the input of the digital-to-analog converter CNA.

Figure 2:
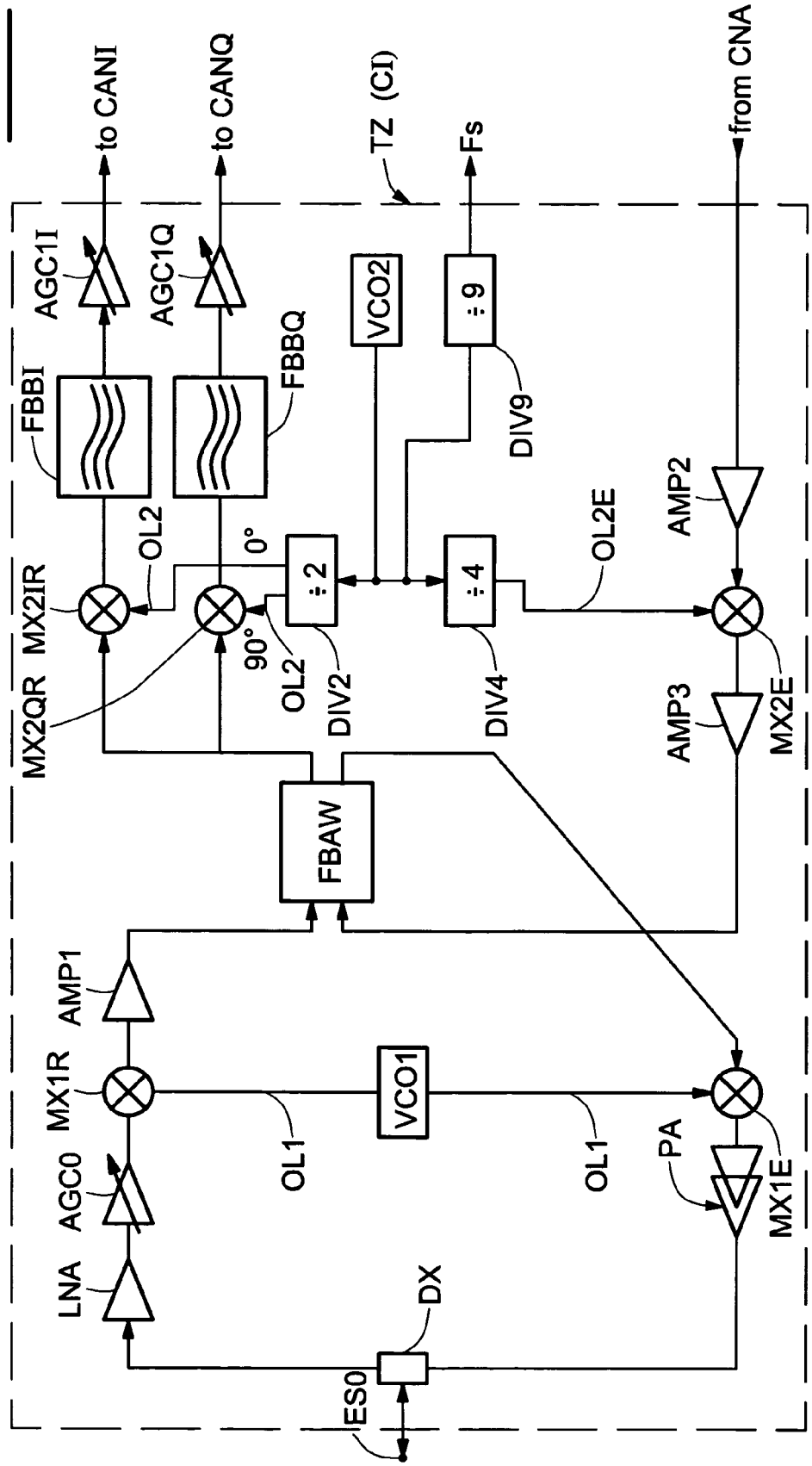
FIG. 2 illustrates, in more detail, the tuner part of the component in FIG. 1.

Reference is now made to FIG. 2, in particular, for the description of an embodiment of the tuner TZ of the component CMP. At its front end, the tuner TZ comprises a duplexer DX connected to the input/output terminal ES0, and to which are connected the reception and transmission channels.

The reception channel, to be down converted, comprises a low-noise amplifier LNA followed by a gain-controlled amplifier AGC0. The amplifier AGC0 is followed by a first frequency transposition stage or mixer MX1R receiving a first frequency transposition signal OL1 produced, for example, by a voltage-controlled oscillator VCO1. The output of the mixer MX1R is connected to the input of an amplifier AMP1, whose output is connected to the input of a band-pass filter FBAW of the bulk acoustic wave type.

Filters of the bulk acoustic wave type are, in themselves, known to those skilled in the art. They are, for example, formed by at least two resonators of the bulk acoustic wave type, also sometimes erroneously referred to as piezoelectric resonators. Such resonators are, for example, described in the article by Sang-Hee Kim et al, entitled "AlN-Based Film Bulk Acoustic Resonator Devices With W/SiO$_2$ Multilayers Reflector For RF Bandpass Filter Application", J. Vac. Sci. Technol. B 19(4), July/August 2001, or again in the article by K. M. Lakin, entitled "Thin Film Resonators And Filters", 1999 IEEE ULTRASONICS SYMPOSIUM, p. 895-906. This last article illustrates filters of the BAW type formed of several resonators arranged in a ladder configuration.

The reception channel continues downstream of the filter FBAW with a second frequency transposition stage formed by two mixers MX2IR and MX2QR. These two mixers respectively belong to the channel I and the channel Q, which are in phase quadrature.

The mixer MX2IR of the channel I (phase channel) receives a frequency transposition signal OL2 originating, after division by two in a divider DIV2, from another voltage-controlled oscillator VCO2. The mixer MX2QR, which belongs to the channel Q, receives the same signal OL2 but is phase-shifted by 90° relative to that delivered to the mixer MX2IR. The two mixers MX2IR and MX2QR are respectively followed by two bandpass filters FBBI and FBBQ, which themselves are followed by two other gain-controlled amplifiers AGC1I and AGC1Q.

Regarding the transmission channel, it comprises an amplifier AMP2, at the front end, followed by a first frequency transposition stage MX2E receiving a frequency transposition signal OL2E originating, after division by four in a frequency divider DIV4, from the oscillator VCO2.

The output of the mixer MX2E is connected to another amplifier AMP3 whose output is connected to the input of the filter FBAW. The output of the filter FBAW is connected to a second frequency transposition stage MX1E also receiving the signal OL1 as frequency transposition signal.

The output of the mixer MX1E is connected to the duplexer DX via a power amplifier PA. Although the latter has been represented as being a part of the integrated circuit CI, it may in practice be situated, at least partially, outside the integrated circuit CI. It will therefore be noted that the bulk acoustic wave filter FBAW is common to both the transmission and the reception channels.

Figure 3:
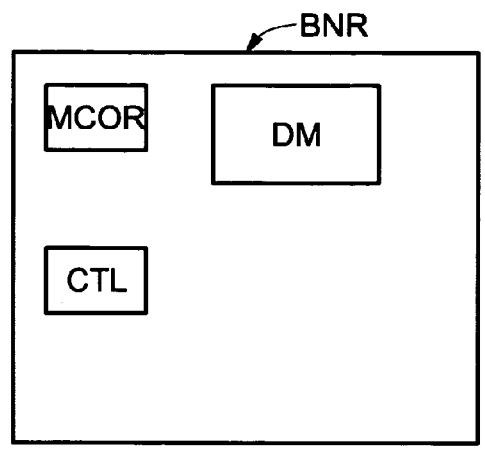
FIGS. 3 and 4 illustrate, in more detail but again schematically, an embodiment of a digital reception unit of a component according to the invention.
Figure 4:
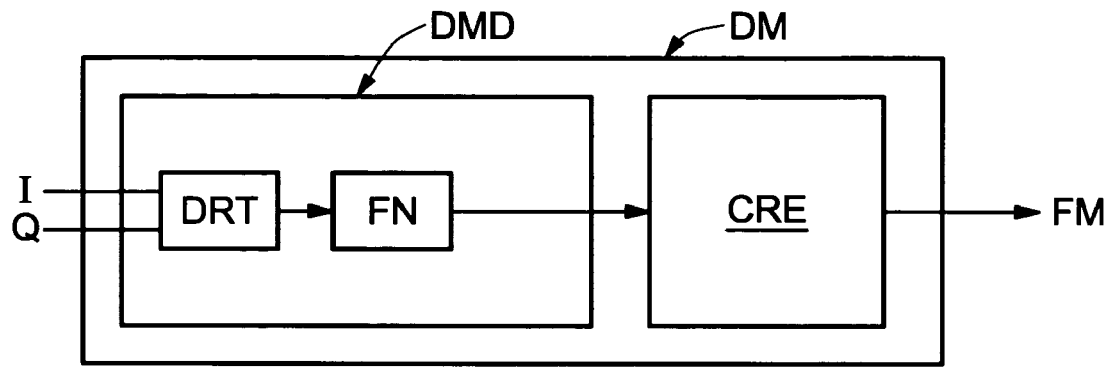

The internal structure of the digital unit BNM will now be described in more detail with particular reference to FIGS. 3 and 4. Aside from control means or controller CTL, which may be implemented via software in a microprocessor, for example, and which are designed to control the gain-controlled amplifiers, the unit BNM comprises, at its front end, a correction circuit MCOR designed to correct imbalances in the phase and amplitude of the two I and Q processing channels.

Such correction circuits are, in themselves, known to those skilled in the art. For more information, reference is directed to U.S. Pat. No. 6,044,112, or to the French Patent Application No. 02/03256.

The digital unit BNM subsequently comprises a channel-decoding module DM, of which an example structure is illustrated in more detail in FIG. 4. More particularly, this digital channel-decoding module DM comprises a stage DMD, comprising a demodulation circuit capable of performing conventional demodulation processing, followed by an error-correction stage CRE that performs conventional Viterbi decoding processing, a disinterlacing, a Reed-Solomon decoding and a descrambling, so as to deliver the packet FM which will be decoded by a decoding unit external to the component CMP and conforming, for example, to the MPEG standard.

The channel decoding module also conventionally comprises a synchronization stage and an equalization stage. Schematically, the stage DMD also comprises, at its front end, a correction circuit, or a "derotator", DRT designed to correct for the phase noise, the frequency drift and the frequency shift of frequency synthesizers. The correction circuit DRT is also used here, according to the invention, to compensate for the bandpass filtering FBBI, FBBQ and thus avoid a margin of error being obtained that is too low for the interpretation of the frequency spectrum. Such derotation circuits may, for example, be those described in the European Patent Application No. 481,543.

The analog filtering is completed by a Nyquist filtering performed in a digital filter FN. The error correction stage CRE then performs conventional error-correction processing well known by those skilled in the art such as Forward Error Correction or FEC.

Figure 5:
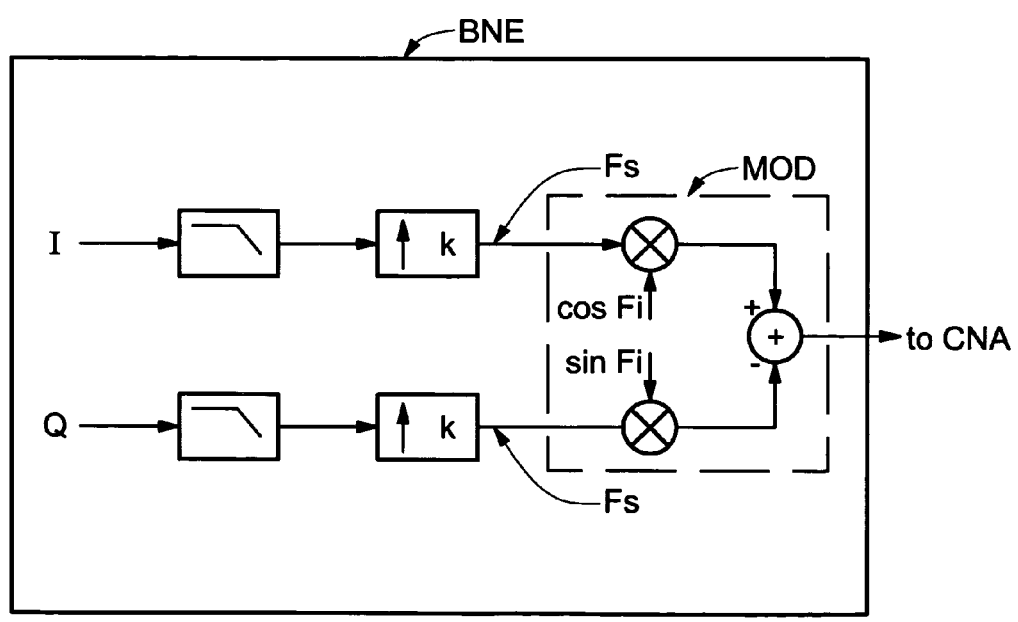
FIG. 5 illustrates, in more detail but again schematically, an embodiment of a digital transmission unit of a component according to the invention.

An example of an embodiment of the digital transmission unit BNE will now be described with reference to FIG. 5. This unit comprises two low-pass filters respectively receiving inputs I and Q which are followed by over-sampling circuitry delivering on each of the digital channels I and Q an over-sampled signal at the frequency Fs. In the example described here, the frequency Fs is delivered by the signal originating from the oscillator VCO2 after frequency division by 9 in a frequency divider DIV9 (FIG. 2).

The two channels I and Q, over-sampled at the frequency Fs, feed a modulator MOD conventionally comprising two multipliers respectively receiving cosFi and sinFi, where Fi designates an intermediate frequency, for example, equal to 67.78 MHz. The output of the two multipliers feeds an adder/subtractor whose output is connected to the input of the digital-to-analog conversion stage.

Subsequently, the signal to be transmitted, composed of a single channel centered on Fi, is transformed into an analog signal by the digital-to-analog converter, for example a 12-bit converter, which is sampled at the frequency Fs. At the output of the digital-to-analog converter, a single-channel signal at the frequency Fi (67.78 MHz) is therefore obtained as well as a set of harmonics at frequencies equal to N.Fs±Fi.

The frequency of the transposition signal applied to the frequency transposition stage MX1R, MX1E of each of the transmission and reception channels is equal to the frequency of the desired channel reduced by the central frequency of the common filter FBAW. By way of an example, if the central frequency of the filter FBAW is equal to 1220 MHz and if the desired channel is centered on the frequency Fd=5.5 GHz, the frequency of the signal OL1 will be equal to 4.28 GHz.

Figure 6:
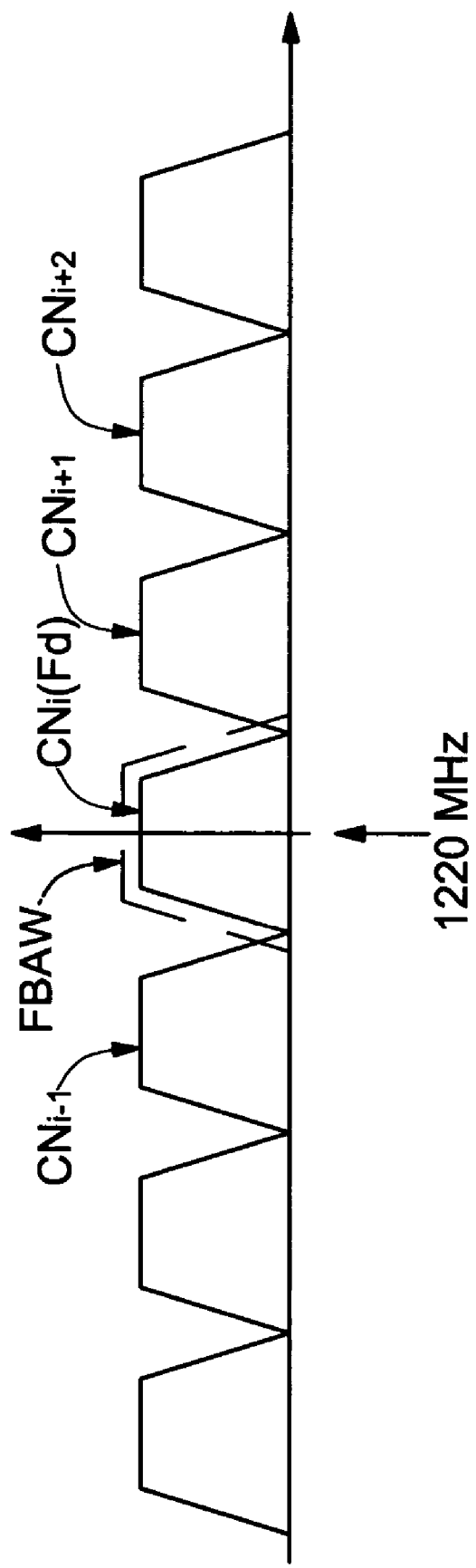
FIG. 6 illustrates schematically a frequency plot of the channels after a first transposition according to the invention.

Consequently, as illustrated in FIG. 6, the signal at the output of the mixer MX1R is a signal comprising all the channels, together with the desired channel CN, centered around the central frequency of the filter FBAW which is 1220 MHz. The filter FBAW is relatively narrow having, for example, a passband of around 20 MHz which corresponds more or less to the width of a channel. Consequently, at the output of the filter FBAW, the signal will virtually only comprise the desired channel centered around 1220 MHz.

Subsequently, this filtered signal undergoes a second down conversion in the two mixers MX2I and MX2Q, respectively receiving the two frequency transposition signals OL2 mutually phase-shifted by 90°. In the example described here, the frequency of the signal delivered by the oscillator VCO2 is equal to 2440 MHz, which corresponds to a frequency of 1220 MHz for the signals OL2.

Consequently, since the frequency of the transposition signals OL2 is equal to the central frequency of the common filter FBAW, this second frequency transposition is therefore of the zero intermediate frequency type and will bring the signal directly down to baseband.

In other words, at the output of the mixers MX2I and MX2Q in the two processing channels I and Q, two quadrature analog signals are obtained in baseband. In other words, the desired channel centered around the zero frequency is presented. The two low-pass filters FBBI and FBBQ are designed to eliminate, notably, the mixing residues here.

After amplification in the amplifiers AGC1I and AGC1Q, the analog signals at the output of the filters FBBI and FBBQ are digitized in the analog-to-digital converters CANI and CANQ having here, for example, a sampling frequency of around 138 MHz (equivalent to Fs/2) with a resolution of about 4 bits.

Regarding the up converted transmission channel, the digital-to-analog converter CNA is sampled at a frequency of 276.11 MHz, supplying an analog signal with a fundamental frequency Fi of 67.78 MHz. In addition, as mentioned previously, this signal presents a certain number of harmonics, and the harmonic 2 has a frequency equal to 610 MHz.

The level of this harmonic is around 25 dB below the level of the fundamental frequency. This is the reason for the signal being amplified in the amplifier AMP2 before mixing in the mixer MX2E with the frequency transposition signal OL2E whose frequency is equal to 610 MHz (2440/4).

After this first frequency up conversion, and after amplification by the amplifier AMP3, the signal resulting from the mixing is filtered by the filter FBAW at 1220 MHz and the signal at the output of the filter FBAW then only comprises the desired channel for transmission, centered around 1220 MHz. Subsequently, following a second frequency up conversion in the frequency transposition stage MX1E, the single-channel signal is now within the 5-6 GHz frequency band, and is transmitted to the output terminal ES0 after amplification by the power amplifier PA.

The central frequency of the integrated filter FBAW cannot be defined with precision based on only the technological and dimensional characteristics of the resonators. Only the passband of the filter is well defined. Accordingly, the invention also provides a determination circuit designed to determine this central frequency during a calibration phase.

Figure 7:
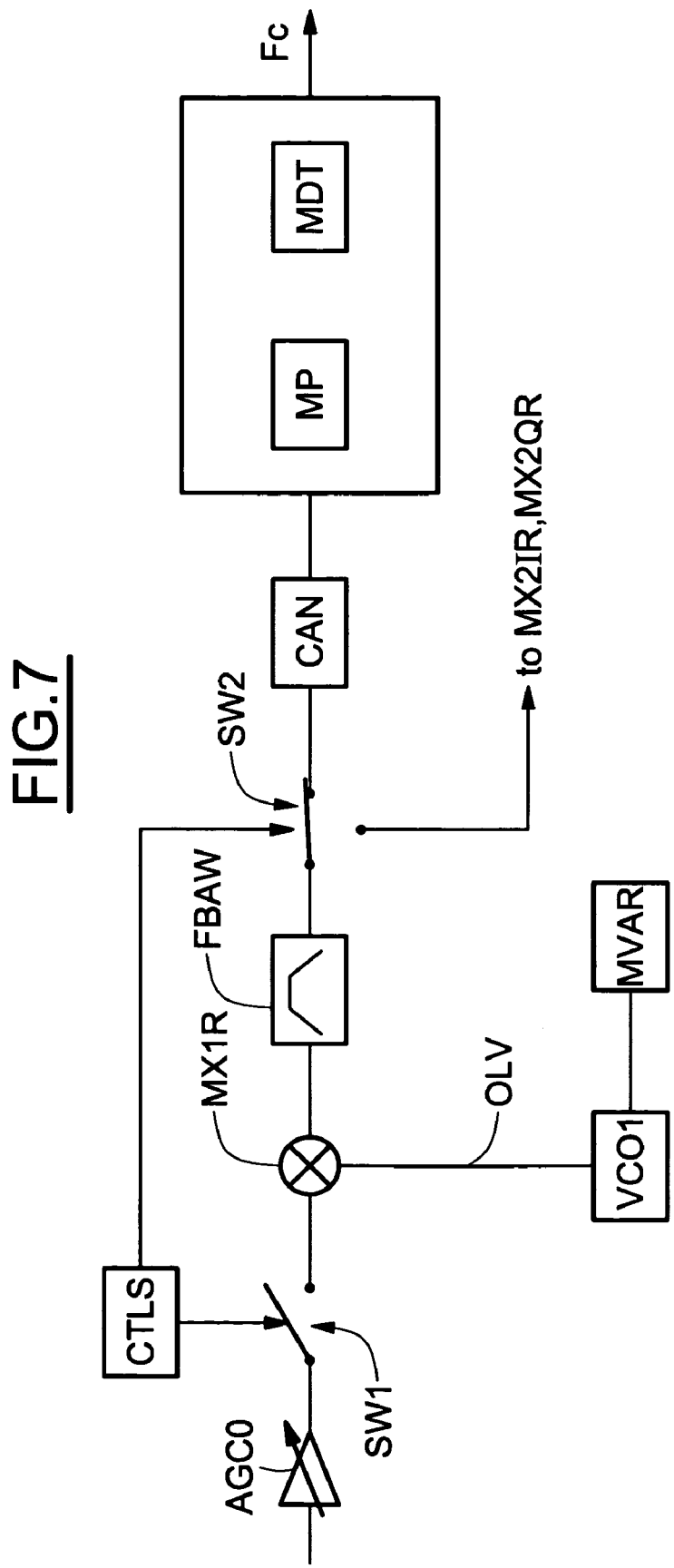
FIG. 7 illustrates schematically a first embodiment relating to a calibration phase, according to the invention, of the central frequency of a bulk acoustic wave type of filter.

In more detail, according to an example embodiment illustrated in FIG. 7, the determination circuit for determining this central frequency comprises a controller CTLS designed to control a first switch SW1 between the output of the amplifier AGCO and the input of the mixer MX1R, and a second switch SW2 connected downstream of the filter FBAW.

In the calibration phase, the first switch SW1 is open (FIG. 7) while during the normal operation phase it is closed. In other words, in the calibration phase, no signal is present at the input of the first transposition stage MX1R, whereas the signal received by the antenna is present at the input of the first transposition stage MX1R in the normal operation phase.

Controller MVAR is designed to control the oscillator VCO1 to vary, around the presumed central frequency of the filter FBAW, the frequency of a calibration transposition signal OLV applied to this transposition stage MX1R. The signal at the output of the filter FBAW is directed by the switch SW2 towards an analog-to-digital converter.

Post-processing circuitry then comprises a circuit MP designed to detect the power of the signal at the output of the bulk acoustic wave filter for each value of the frequency of the calibration signal, and circuitry MDT designed to detect the maximum power. The central frequency Fc of the filter FBAW is then the frequency of the calibration signal corresponding to this maximum power value.

As an example, the circuitry MP can calculate the power of the signal by calculating its modulus for instance. A simplified way to calculate the modulus of the signal is provided by the following formula:

Modulus $(S)=\text{Max }(\text{abs}(S))+\frac{1}{2}\text{Min }(\text{abs}(S))$

In this formula, Max designates the maximum value, Min designates the minimum value and abs designates the absolute value, and S is the signal delivered by the analog-to-digital converter CAN.

Figure 8:
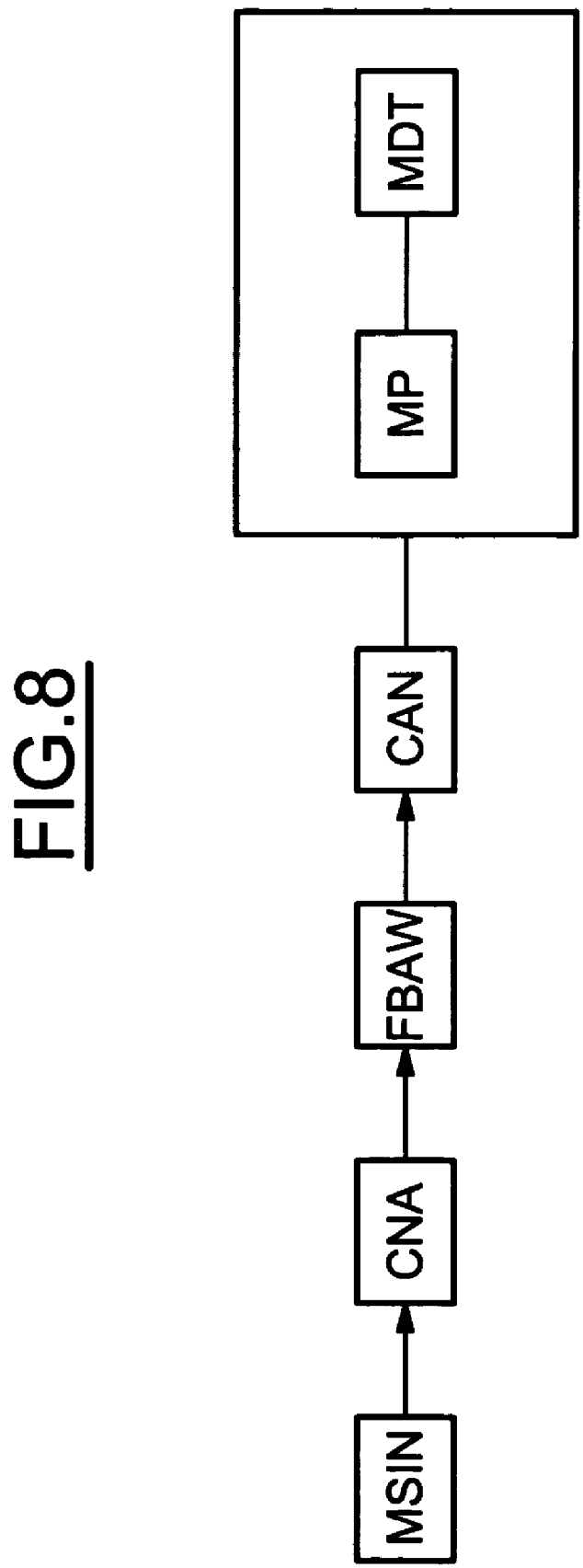
FIG. 8 illustrates schematically a second embodiment also relating to a calibration phase of the central frequency of a bulk acoustic wave type filter according to the invention.

However, another possibility also exists in regards to the circuitry for determining the central frequency of the filter FBAW. This possibility is illustrated in FIG. 8 and it uses the presence of the digital-to-analog converter CNA.

In more detail, the determination circuit for determining the central frequency of the filter FBAW here comprise circuitry MSIN designed to deliver a variable-frequency sinusoidal calibration signal to the input of the digital-to-analog conversion stage CNA and to vary the frequency of this calibration signal.

The signal at the output of the filter FBAW is then sent via an analog-to-digital converter to post-processing circuitry, analogous to those described above with regard to the first variant embodiment for determining the central frequency, which allows the maximum power of the signal at the output of the filter FBAW to be detected.

Figure 9:
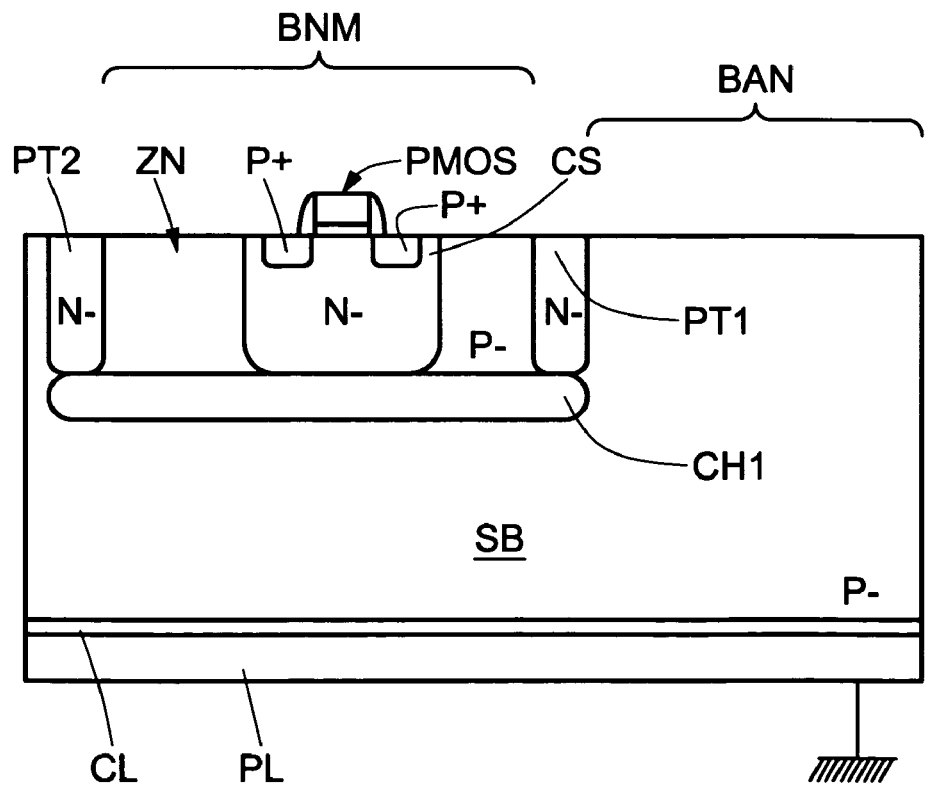
FIG. 9 illustrates schematically a technological embodiment of a component according to the invention.

From a technological standpoint, the integrated circuit CI according to the invention is, for example, implemented in 0.13 μm CMOS technology on a monolithic substrate SB made from silicon, for example p$^-$-type silicon (FIG. 9).

To absorb high-frequency current peaks, it is preferable to mount a metal plate PL onto the rear surface of the substrate SB by a conventional conductive adhesive CL. This metal plate is then connected to ground. The thin layer of oxide that forms naturally on the silicon of the substrate constitutes the dielectric of a capacitor whose two electrodes are respectively formed by the substrate SB and the metal plate PL. This capacitor, whose capacitance is relatively high, thus allows the high-frequency current peaks to be absorbed.

Furthermore, the digital part BNM of the component CMP is fabricated within an area ZN of the substrate which is isolated from the rest of the substrate (in which the analog part BAN of the component is fabricated) by an n$^-$-doped semiconducting barrier, formed here by a buried layer CH1 and two wells PT1 and PT2. Also, the PMOS transistors of the digital part are fabricated within an n$^-$-filled cavity sunk into contact with the buried layer CH1.

Further, to avoid noise on the power supply voltage Vdd being transmitted via the n$^-$-filled cavities to the analog part, which would directly interfere especially with the amplifier LNA and the filter FBAW, it is advantageous to bias all the n$^-$-filled cavities with a bias voltage different from that supplying the transistors situated within this isolated area ZN of the substrate.

The invention is not limited to the embodiment that has just been described, but embraces all its variations. Thus, the common filter may equally be of the surface acoustic wave type, as illustrated in FIG. 10.

Figure 10:
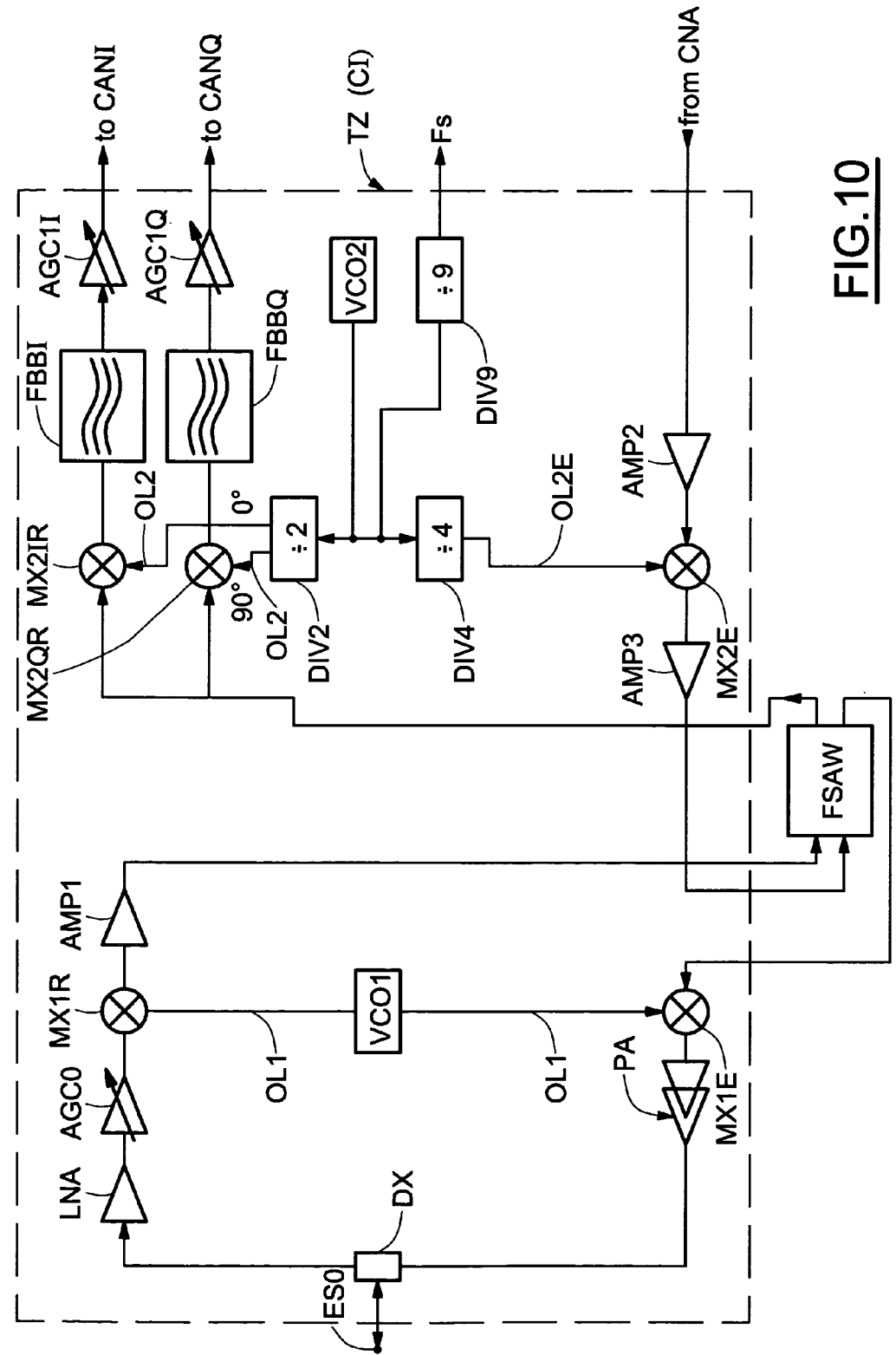
FIG. 10 illustrates schematically another embodiment of the tuner part of a component according to the invention comprising a filter of the surface acoustic wave type.

The embodiment illustrated in FIG. 10 only differs from that illustrated in FIG. 2 by the fact that the surface acoustic wave filter FSAW is now located outside the integrated circuit incorporating the tuner TZ.

Filters of the surface acoustic wave type are, in themselves, known to those skilled in the art. A filter having a central frequency of 1220 MHz could, for example, could be used. Such a filter is marketed by the German company EPCOS AG under the reference B 1610. This filter FSAW is also relatively narrow by nature having a passband of 20 MHz. In addition, a filter of the surface acoustic wave type does not require calibration to precisely determine its central frequency.

That which is claimed is:

1. An electronic component comprising:
   a shared input/output terminal for receiving a multichannel analog signal within a predetermined frequency band, and for transmitting a single-channel analog signal within the predetermined frequency band;
   a tuning module comprising
     a reception channel connected to said shared input/output terminal and operating as a two-stage down conversion to baseband reception channel, said reception channel comprising a first mixer,
     a transmission channel connected to said shared input/output terminal and operating as a two-stage up conversion transmission channel, said transmission channel comprising a second mixer, and
     said reception and transmission channels comprising a common filter connected to said first and second mixers, said common filter comprising an acoustic wave filter;
   an analog-to-digital conversion stage connected to said reception channel;
   a digital-to-analog conversion stage connected to said transmission channel;
   a digital reception unit connected to an output of said analog-to-digital conversion stage; and
   a digital transmission unit connected to an input of said digital-to-analog conversion stage.

2. An electronic component according to claim 1, wherein said acoustic wave filter comprises at least one of a bulk acoustic wave filter and a surface acoustic wave filter.

3. An electronic component according to claim 1, wherein a transposition signal applied to each of said first and second mixers has a frequency equal to a frequency of a desired channel reduced by a central frequency of said common filter; and wherein said reception channel further comprises third and fourth mixers connected between said common filter and said analog-to-digital conversion stage, and a transposition signal applied to said third and fourth mixers has a frequency equal to the central frequency of said common filter; and wherein said transmission channel further comprises a fifth mixer connected between said common filter and said digital-to-analog conversion stage, and a transposition signal applied to said fifth mixer has a frequency harmonic equal to the central frequency of said common filter.

4. An electronic component according to claim 3, wherein the frequency of the transposition signal applied to said fifth mixer and a sampling frequency of said digital-to-analog conversion stage are sub-multiples of the central frequency of said common filter.

5. An electronic component according to claim 1, wherein said acoustic wave filter comprises a bulk acoustic wave filter, said bulk acoustic wave filter comprising a frequency determination circuit for determining the central frequency thereof.

6. An electronic component according to claim 5, wherein said frequency determination circuit comprises:
   a calibration circuit that, in absence of a signal at an input to said second mixer, varies a frequency of a calibration signal applied to said second mixer so that it is below a lower limit of a frequency range of the channels; and,
   a determination circuit for determining, for each value of the frequency of the calibration signal, a power of an output signal from said bulk acoustic wave filter, and for detecting a maximum power, so that the central frequency of said bulk acoustic wave filter is the frequency of the calibration signal corresponding to this maximum power.

7. An electronic component according to claim 5, wherein said frequency determination circuit comprises:
   a calibration circuit for delivering a sinusoidal calibration signal having a variable frequency to an input of said digital-to-analog conversion stage, said calibration circuit varying a frequency of the calibration signal; and
   a detection circuit for determining, for each value of the frequency of the calibration signal, a power of an output signal from said bulk acoustic wave filter, and for detecting a maximum power, so that the central frequency of said bulk acoustic wave filter is the frequency of the calibration signal corresponding to this maximum power.

8. An electronic component according to claim 1, wherein said acoustic wave filter comprises a bulk acoustic wave filter, said bulk acoustic wave filter comprising a substrate, and a tuning module on said substrate so that said bulk acoustic wave filter is configured as an integrated circuit.

9. An electronic component according to claim 8, wherein said tuning module is monolithicly integrated in said substrate.

10. An electronic component according to claim 1, wherein said acoustic wave filter comprises a surface acoustic wave filter, said surface acoustic wave filter comprising a substrate, and a tuning module on said substrate so that said surface acoustic wave filter is configured as an integrated circuit.

11. An electronic component according to claim 10, wherein said tuning module is monolithicly integrated in said substrate.

12. An electronic component according to claim 1, wherein a reception signal received by said reception channel and a transmission signal transmitted by said transmission channel each comprise signals modulated based upon an orthogonal frequency division multiplexing modulation.

13. A device for transmission/reception in a wireless local area network (WLAN), the device comprising:
   a WLAN antenna;
   a shared input/output terminal connected to said WLAN antenna for receiving a multichannel analog signal within a predetermined frequency band, and for transmitting a single-channel analog signal within the predetermined frequency band;
   a tuning module comprising
     a reception channel connected to said shared input/output terminal and operating as a two-stage down conversion to baseband reception channel, said reception channel comprising a first mixer,
     a transmission channel connected to said shared input/output terminal and operating as a two-stage up conversion transmission channel, said transmission channel comprising a second mixer, and
     said reception and transmission channels comprising a common filter connected to said first and second mixers, said common filter comprising an acoustic wave filter;
   an analog-to-digital conversion stage connected to said reception channel;
   a digital-to-analog conversion stage connected to said transmission channel;
   a digital reception unit connected to an output of said analog-to-digital conversion stage; and
   a digital transmission unit connected to an input of said digital-to-analog conversion stage.

14. A device according to claim 13, wherein said acoustic wave filter comprises at least one of a bulk acoustic wave filter and a surface acoustic wave filter.

15. A device according to claim 13, wherein a transposition signal applied to each of said first and second mixers has a frequency equal to a frequency of a desired channel reduced by a central frequency of said common filter; and wherein said reception channel further comprises third and fourth mixers connected between said common filter and said analog-to-digital conversion stage, and a transposition signal applied to said third and fourth mixers has a frequency equal to the central frequency of said common filter; and wherein said transmission channel further comprises a fifth mixer connected between said common filter and said digital-to-analog conversion stage, and a transposition signal applied to said fifth mixer has a frequency harmonic equal to the central frequency of said common filter.

16. A device according to claim 15, wherein the frequency of the transposition signal applied to said fifth mixer and a sampling frequency of said digital-to-analog conversion stage are sub-multiples of the central frequency of said common filter.

17. A device according to claim 13, wherein said acoustic wave filter comprises a bulk acoustic wave filter, said bulk acoustic wave filter comprising a frequency determination circuit for determining the central frequency thereof.

18. A device according to claim 17, wherein said frequency determination circuit comprises:
    a calibration circuit that, in absence of a signal at an input to said second mixer, varies a frequency of a calibration signal applied to said second mixer so that it is below a lower limit of a frequency range of the channels; and,
    a determination circuit for determining, for each value of the frequency of the calibration signal, a power of an output signal from said bulk acoustic wave filter, and for detecting a maximum power, so that the central frequency of said bulk acoustic wave filter is the frequency of the calibration signal corresponding to this maximum power.

19. A device according to claim 17, wherein said frequency determination circuit comprises:
    a calibration circuit for delivering a sinusoidal calibration signal having a variable frequency to an input of said digital-to-analog conversion stage, said calibration circuit varying a frequency of the calibration signal; and
    a detection circuit for determining, for each value of the frequency of the calibration signal, a power of an output signal from said bulk acoustic wave filter, and for detecting a maximum power, so that the central frequency of said bulk acoustic wave filter is the frequency of the calibration signal corresponding to this maximum power.

20. A device according to claim 13, wherein said acoustic wave filter comprises substrate, and a tuning module on said substrate so that said acoustic wave filter is configured as an integrated circuit.

21. A device according to claim 20, wherein said tuning module is monolithicly integrated in said substrate.

22. A device according to claim 13, wherein a reception signal received by said reception channel and a transmission signal transmitted by said transmission channel each comprise signals modulated based upon an orthogonal frequency division multiplexing modulation.

23. A method for coding and decoding signals in a video decoder comprising a shared input/output terminal; a tuning module comprising a reception channel connected to the shared input/output terminal and comprising a first mixer; a transmission channel connected to the shared input/output terminal and comprising a second mixer; an analog-to-digital conversion stage connected to the reception channel; a digital-to-analog conversion stage connected to the transmission channel; a digital reception unit connected to an output of the analog-to-digital conversion stage; and a digital transmission unit connected to an input of the digital-to-analog conversion stage; the method comprising:
    receiving via the shared input/output terminal for the reception channel a multichannel analog signal within a predetermined frequency band, the reception channel operating as a two-stage down conversion to baseband reception channel;
    transmitting via the shared input/output terminal for the transmission channel a single-channel analog signal within the predetermined frequency band, the transmission channel operating as a two-stage up conversion transmission channel;
    filtering signals for the reception and transmission channels using a common filter connected to the first and second mixers, the common filter comprising an acoustic wave filter.

24. A method according to claim 23, wherein the acoustic wave filter comprises at least one of a bulk acoustic wave filter and a surface acoustic wave filter.

25. A method according to claim 23, wherein a transposition signal applied to each of the first and second mixers has a frequency equal to a frequency of a desired channel reduced by a central frequency of the common filter; and wherein the reception channel further comprises third and fourth mixers connected between the common filter and the analog-to-digital conversion stage, and a transposition signal applied to the third and fourth mixers has a frequency equal to the central frequency of the common filter; and wherein the transmission channel further comprises a fifth mixer connected between the common filter and the digital-to-analog conversion stage, and a transposition signal applied to the fifth mixer has a frequency harmonic equal to the central frequency of the common filter.

26. A method according to claim 25, wherein the frequency of the transposition signal applied to the fifth mixer and a sampling frequency of the digital-to-analog conversion stage are sub-multiples of the central frequency of the common filter.

27. A method according to claim 23, wherein the acoustic wave filter comprises a bulk acoustic wave filter, the bulk acoustic wave filter comprising a frequency determination circuit for determining the central frequency thereof.

28. A method according to claim 27, wherein the frequency determination circuit comprises:
    a calibration circuit that, in absence of a signal at an input to the second mixer, varies a frequency of a calibration signal applied to the second mixer so that it is below a lower limit of a frequency range of the channels; and
    a determination circuit for determining, for each value of the frequency of the calibration signal, a power of an output signal from the bulk acoustic wave filter, and for detecting a maximum power, so that the central frequency of the bulk acoustic wave filter is the frequency of the calibration signal corresponding to this maximum power.

29. A method according to claim 27, wherein the frequency determination circuit comprises:
    a calibration circuit for delivering a sinusoidal calibration signal having a variable frequency to an input of the digital-to-analog conversion stage, the calibration circuit varying a frequency of the calibration signal; and a detection circuit for determining, for each value of the frequency of the calibration signal, a power of an output signal from the bulk acoustic wave filter, and for detecting a maximum power, so that the central frequency of the bulk acoustic wave filter is the frequency of the calibration signal corresponding to this maximum power.

30. A method according to claim 23, wherein the acoustic wave filter comprises a substrate, and a tuning module on the substrate so that the acoustic wave filter is configured as an integrated circuit.

31. A method according to claim 30, wherein the tuning module is monolithicly integrated in the substrate.

32. A method according to claim 23, wherein a reception signal received by the reception channel and a transmission signal transmitted by the transmission channel each comprise signals modulated based upon an orthogonal frequency division multiplexing modulation.

* * * * *